Patented Nov. 22, 1927.

1,650,109

UNITED STATES PATENT OFFICE.

HOWARD L. BENDER, OF BLOOMFIELD, NEW JERSEY, ASSIGNOR TO BAKELITE CORPORATION, OF NEW YORK, N. Y., A CORPORATION OF DELAWARE.

SYNTHETIC RESIN COMPOSITION.

No Drawing.   Application filed November 10, 1926. Serial No. 147,620.

This invention relates to resins and resin compositions of the phenol-methylene type, and specifically to a reactive phenol-methylene resin, or resinoid derived therefrom, containing a plasticizing addition including a resinous product derived from paratoluenesulfonamide. Such plasticizing addition may be incorporated with the clear phenol-methylene resin, or with the resin dissolved in appropriate varnish or lacquer solvents, or combined with fibrous or other fillers to form a molding mixture. By reactive resins are meant such as are capable of transformation by heat to the infusible or resinoid state, as now well understood in this art.

I have found that paratoluenesulfonamide reacts with paraform, formaldehyde and equivalent bodies having a mobile methylene group to yield resinous products which form solid solutions with the phenol-methylene resins and resinoids, and have a plasticizing effect thereon. The proportion of paratoluenesulfonamide resin will of course vary according to the particular effect desired, and it may be used alone or in conjunction with other plasticizing agents.

I may incorporate with the phenol-methylene resin, or with the raw materials yielding this resin, a pre-formed paratoluenesulfonamide resin, made for example by reacting with formaldehyde or paraform upon molecular proportions of paratoluenesulfonamide; or I may prepare a phenol-methylene resin containing an excess of formaldehyde or paraform, and therefore free or nearly free from phenol, and incorporate therewith paratoluenesulfonamide in proportion to react with the excess methylene compound, thereby forming the plasticizing addition in place. This procedure is especially advantageous when plastic resins substantially free from uncombined phenols are desired.

While I prefer to use the resins derived from paratoluenesulfonamide as the plasticizing agent, it is within my invention to employ the amide itself as such agent, inasmuch as it also is capable of entering into solid solution with the phenol-methylene resinoids and plasticizing the same.

I claim:

1. As a new composition of matter, a phenol-methylene resin characterized by the presence therein of paratoluenesulfonamide.

2. As a new composition of matter, a phenol methylene resin characterized by the presence therein of a resinous reaction product of paratoluenesulfonamide.

3. Process of preparing a plasticized resin composition, comprising making a phenol-methylene resin containing an excess of methylene-containing body, and reacting thereon with paratoluenesulfonamide.

In testimony whereof, I affix my signature.

HOWARD L. BENDER.